403-312 AU 353 EX
FIP8005 OR RE 19,982

May 26, 1936. L. C. MOORE Re. 19,982

OIL FIELD DERRICK POST Orig. 2,031,002

Original Filed Feb. 8, 1934

LEE C. MOORE,

INVENTOR.

BY James R Bole

ATTORNEYS.

189. METALL
19

Reissued May 26, 1936

Re. 19,982

UNITED STATES PATENT OFFICE 19,982

OIL FIELD DERRICK POST

Lee C. Moore, Tulsa, Okla.

Original No. 2,031,002, dated February 18, 1936, Serial No. 710,272, February 8, 1934. Application for reissue March 26, 1936, Serial No. 71,075

3 Claims. (Cl. 189—19)

My invention relates to new and useful improvements in posts for oil field derricks and has for its object in general to provide a derrick leg or column or post which is light in weight for its relative strength, cheap to make and easy to couple or joint, and, although in the modified form of an H beam, is adapted to be coupled with a tubular coupling or joint member; and in particular to provide such a beam for use in the fabrication of oil field steel derricks wherein the benefits of tubular steel construction may be derived without the attendant extra cost of tubular posts now used, and wherein the joints may be made with tubular couplings as aforesaid.

With the above and other objects in view which will be disclosed as the description proceeds, my invention consists in the novel features hereinafter set forth, shown in the accompanying drawing and more particularly pointed out in the appended claims.

Referring to the drawing in which like numerals designate similar parts throughout the several views.

Figure 2:
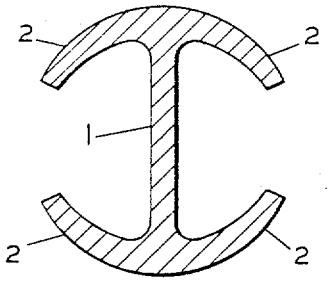
Fig. 2 is a cross sectional view of the same.
Figure 1:
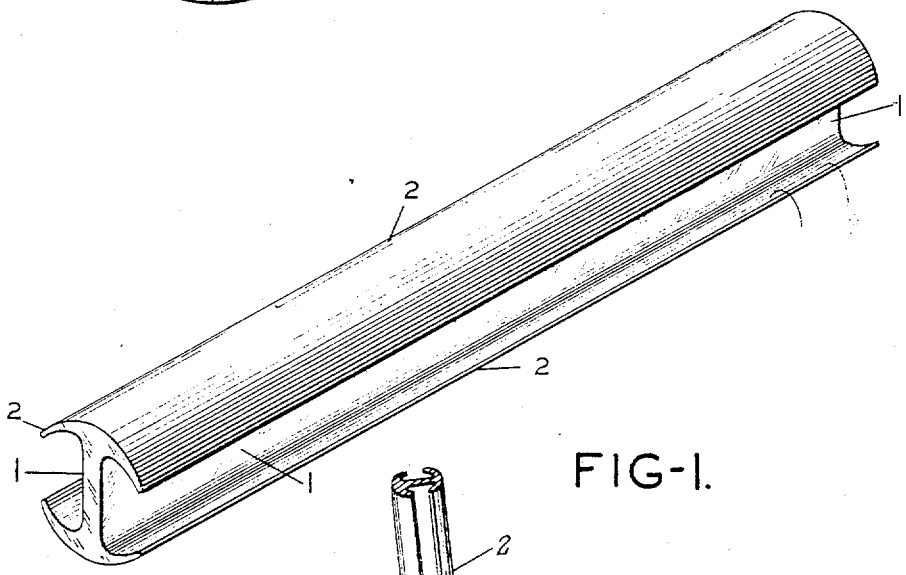
Fig. 1 is a view in perspective of my derrick post.
Figure 3:
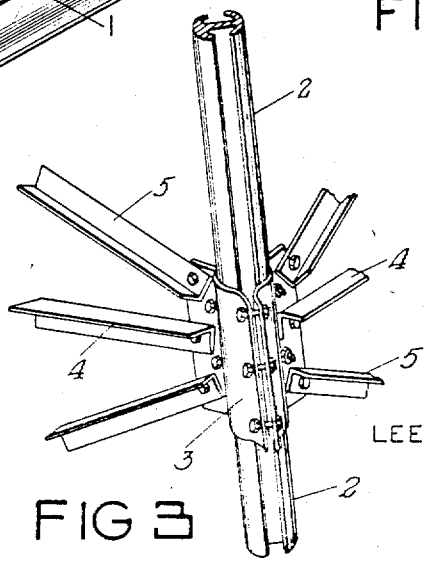
Fig. 3 is a perspective view of a portion of a derrick having my improvements.

Numeral 1 represents the web portion of the beam and 2 the flange portions thereof.

The preferred form of my beam structure is as shown in the drawing wherein in cross section the outer surfaces of the flanges are in the form of an arc of a circle the center of which is located substantially in the longitudinal axis of the web. The effect of turning in the flanges of the beam is not only to strengthen it but makes possible the use of such a beam with tubular couplings and is particularly advantageous for use as corner posts in fabricated derrick structures. Moreover in addition to making a lighter post for the derrick than one made of tubing of equivalent strength, the cost is less, inasmuch as structural steel is much cheaper than tubular steel and the cost of converting an H beam into a beam of my form is very little, if any more than the original cost of the H beam. The conversion may be effected by further rolling an H beam, after it is already formed, into a beam of my form, thus necessitating no expensive mill equipment in the making of my beams.

In use in a fabricated oil field derrick, my form of beam replaces the tubular corner posts and is jointed by the regular tubular couplers 3 and the girders or girts 4 and the braces and stays 5 are connected in the usual manner.

What I claim and desire to secure by Letters Patent is:

1. A derrick post and joint structure, comprising axially aligned post sections arranged end to end, one on the other, each post section comprising a substantially flat web extending across the axis of the section, the outer portions of said web terminating in arcuate-shaped flanges on opposite sides of the web and circumferentially arranged in relation to each other, thereby forming a substantially cylindrical body extending from end to end of the section and reinforced internally by said web, a sleeve surrounding the adjacent end portion of said sections and into which said sections extend from opposite ends of the sleeve, and means for securing said sleeve to the adjacent end portions of said sections.

2. A derrick post and joint structure, comprising axially aligned post sections arranged end to end, one on the other, each post section comprising a substantially flat web extending across the axis of the section, the outer portions of said web terminating in flanges on opposite sides of the web, the flanges at the ends of each post section being of arcuate shape and extending circumferentially in relation to each other, thereby forming substantially cylindrical end portions reinforced internally by said web, a sleeve surrounding the adjacent end portions of said sections and into which said sections extend from opposite ends of the sleeve, and means for securing said sleeve to the adjacent end portions of said sections.

3. A derrick post and joint structure, comprising axially aligned post sections arranged end to end, one on the other, each post section being of substantially H-shape in cross section throughout its length and comprising a plane web terminating in oppositely disposed flanges, the flanges at the ends of each section being of arcuate shape and extending circumferentially in relation to each other, thereby forming substantially cylindrical end portions reinforced internally by said web, a sleeve surrounding the adjacent end portions of a pair of said sections and into which the last-mentioned sections extend from opposite ends of the sleeve, and means securing said sleeve to the adjacent end portions of the last-mentioned sections.

LEE C. MOORE.